(12) United States Patent
Bjerregaard (10) Patent No.: US 7,995,618 B1
(45) Date of Patent: Aug. 9, 2011

(54) SYSTEM AND A METHOD OF TRANSMITTING DATA FROM A FIRST DEVICE TO A SECOND DEVICE

(75) Inventor: Tobias Bjerregaard, Frederiksberg C (DK)

(73) Assignee: Teklatech A/S, Kgs.Lyngby (DK)

( * ) Notice: Subject to any disclaimer, the term of this patent is extended or adjusted under 35 U.S.C. 154(b) by 549 days.

(21) Appl. No.: 11/905,422

(22) Filed: Oct. 1, 2007

(51) Int. Cl.
*H04J 3/06* (2006.01)

(52) U.S. Cl. ............... 370/503; 370/516; 370/518

(58) Field of Classification Search .......... 370/347, 370/452, 231, 235, 236, 503, 518; 451/5, 451/47; 702/168; 33/501.9
See application file for complete search history.

(56) References Cited

U.S. PATENT DOCUMENTS

| | | | | |
|---|---|---|---|---|
| 4,290,108 | A * | 9/1981 | Woehrle et al. | 702/124 |
| 4,514,840 | A * | 4/1985 | Bader et al. | 370/294 |
| 4,980,851 | A | 12/1990 | Komori et al. | |
| 5,264,738 | A * | 11/1993 | Veendrick et al. | 327/203 |
| 5,305,277 | A * | 4/1994 | Derwin et al. | 365/230.02 |
| 5,701,296 | A * | 12/1997 | Yamauchi | 370/282 |
| 5,723,989 | A * | 3/1998 | Steinlechner | 327/3 |
| 5,808,486 | A | 9/1998 | Smiley | |
| 6,229,360 | B1 * | 5/2001 | Mizuno et al. | 327/141 |
| 6,346,828 | B1 * | 2/2002 | Rosen et al. | 326/56 |
| 6,594,772 | B1 | 7/2003 | Tsai et al. | |
| 6,747,997 | B1 * | 6/2004 | Susnow et al. | 370/509 |
| 2002/0049936 | A1 | 4/2002 | Gutnik et al. | |
| 2003/0197537 | A1 | 10/2003 | Saint-Laurent | |
| 2003/0201814 | A1 | 10/2003 | Braunisch et al. | |
| 2004/0114609 | A1 * | 6/2004 | Swarbrick et al. | 370/400 |
| 2004/0151209 | A1 * | 8/2004 | Cummings et al. | 370/503 |
| 2005/0024110 | A1 | 2/2005 | Klass | |
| 2007/0047375 | A1 * | 3/2007 | Minzoni | 365/233 |
| 2008/0180151 | A1 * | 7/2008 | Gong et al. | 327/175 |
| 2008/0276116 | A1 * | 11/2008 | Bjerregaard | 713/501 |

OTHER PUBLICATIONS

Tobias Bjerregaard et al., "A Scalable, Timing-Safe, Network-on-Chip Architecture with an Integrated Clock Distribution Method", *Design Automation and Test in Europe Conference*, Nice, France, Apr. 16-20, 2007.
El-Amawy, "Clocking Arbitrarily Large Computing Structures Under Constant Skew Bound", IEEE Transactions on Parallel and Distributed Systems, vol. 4, No. 3, Mar. 1993, pp. 241-255.

\* cited by examiner

*Primary Examiner* — Chi H Pham
*Assistant Examiner* — Farah Faroul
(74) *Attorney, Agent, or Firm* — Harness, Dickey & Pierce, P.L.C.

(57) ABSTRACT

A system and a method of transmitting data from a first device to a second device, both devices receiving a clock signal, the first device acting on a first flank of the clock signal and the second device acting on a second flank of the clock signal. A chain of this type of devices may be used, where every second device acts on the first flank and the others on the second flank. In this manner, the data transport may be provided at the clock frequency while allowing backpressure.

18 Claims, 5 Drawing Sheets

SYSTEM AND A METHOD OF TRANSMITTING DATA FROM A FIRST DEVICE TO A SECOND DEVICE

Example embodiments relate to a system for transmitting data between two devices and a method of operating the system.

BACKGROUND

In order to optimize the performance of complex systems, it is of utmost importance to pay close attention to the handling of the data flow through these systems. Data paths are often pipelined to improve throughput. Back pressure flow control, using various forms of handshaking mechanisms which allow the data to stall in the pipeline if the forward path is congested, is sometimes used in these pipelines.

To implement full back pressure flow control, at least two handshake phases are required. This means that in synchronously clocked systems, either two registers are needed for each pipeline stage (an extra stall buffer is required to allow a clock cycle for reacting by stalling the data, if the pipeline is congested in the forward direction), or else only every other clock cycle can be used for transferring data. Alternatively, pipeline stages can be clocked on both rising and falling clock edges; however this requires complex dual edge triggered logic in the pipeline stages.

Systems of this type may be found in e.g., US 2005024110 to Klass and U.S. Pat. No. 4,980,851 to Komori et al.

A synchronous system is an abstraction, in that a physically implemented system will never be ideally synchronous. Variability in clock line delays causes unpredictable skew between clocking signals at different pipeline stages. This skew can result in circuit failure. Also, it is of great importance in complex system's to use as little power as possible, hence data routing circuits should only be clocked when there is data to be routed.

SUMMARY

The present invention contains a number of innovations making it advantageous compared to the prior art. It implements a back pressure data pipeline handshake scheme, which can allow data to be transferred through the pipeline at full clock speed, without the necessity for extra stall buffers, and with each pipeline stage needing only to be clocked at one clock edge. Also, the circuits resulting from applying the scheme are robust to variability in the clock line delays, i.e. robust to variability in physical process parameters and operating conditions. Finally, the handshaking makes fine-grained clock gating possible, so that most of the circuit needs only be clocked when there is data activity in the pipeline, hence reducing power usage considerably.

In a first aspect, the invention relates to a system comprising:
a data transmission path,
a first device adapted to output data to the data transmission path,
a second device adapted to receive the data from the data transmission path,
a clock generator adapted to generate a periodic clocking signal comprising a period having a first and a second flanks, wherein
the second device being adapted to identify the first flank of a first period of the clocking signal and then output to the first device receiver information relating to whether the second device has received or is able to receive data from the data transmission path,
the first device is adapted to determine whether it has received receiver information and, if so, identify the second flank of the first period of the clocking signal and then transmit information to the second device.

In this respect, a data transmission path may be any type of path for transmitting data, such as a serial or parallel connection via wires, optical waveguide or wirelessly. A parallel connection may have any number of parallel connections, such as 2, 4, 8, 16, 32 or more.

The present system is particularly suited for embedding into chips for transporting data between individual parts or systems on the chip. In this type of system, a large number of devices may be present for forming a network on the chip (NoC).

Presently, a periodic clocking signal is a periodic signal having a period which may be used for the devices to coordinate the actions thereof. The period of this periodic signal has two flanks or parts which preferably are two well-defined voltage/current-variations (seen over time). Many different types of flanks may be used, depending on the actual clocking signal. One example of a periodic signal is a sine wave, where the flank types may be the voltage increase of half the period and the voltage decrease of the other half of the period. In this example, a flank is a point in time well-defined within a flank type, such as a zero-crossing of a voltage, a maximum or the like. A widely used type of timing signal is a square wave, where the low-to-high shift may be taken as one flank type and the high-to-low shift may be taken as the other flank type. In this relation, the flanks preferably are defined by the high-to-low and low-to-high shifts as these are well-defined in time.

Preferably, the first flank type and the second flank type are each others inverse, where inverting is as is normal in binary systems/circuits.

Normally or often, the devices will additionally be connected to other data providing and/or data receiving elements, as the data normally is generated by one entity for use by another entity, and the devices in between merely serve to transport the data.

Different types of overall data transportation may be used. Two such types are push and pull protocols. A push protocol is one where the transmitter (first device) forwards data as soon as this is possible. Thus, the receiver (second device) does not receive or grab the data, before it is ready to do so. This will be the situation where the second device would inform the first device that it has received data from the data transmission path.

A pull protocol is one where data is not transmitted before the receiver actively requests data. This would be the situation where the second device informs the first device that it is able to receive data.

An advantage of the present invention is seen in that the two devices corresponding with each other do so on different points in time defined by the two flanks of the timing signal. Actually, it is preferred that the second device outputs the receiver information as soon as identifying or detecting the first flank, such as trigged by the first flank, and that the first device transmits the information as soon as identifying or detecting the second flank, such as trigged by the second flank.

Naturally, the present two-device system may form part of any network of devices, where each device is trigged by the other flank than the device(s) transmitting data or information thereto. Thus, large chains or matrices of devices may be formed for exchanging or transmitting the data, as is known from Networks on Chips, switch networks/back bones, or the like.

In a preferred embodiment, the first device is adapted to output the information to the data transmission path as data. In this regard, the data preferably is transmitted as a parallel data packet of any number of bits, as this data packet or word may then be transmitted in one clock cycle and/or simultaneously.

In this embodiment, it is also seen that if there is no data to transmit, or if the second device is not able to receive data (such as if the second device does not inform the first device that it is able to receive data or it has not received data), data is not received by the second device. This is power conserving in that receipt or grabbing of data is power consuming.

In another embodiment, the second device comprises data capturing means adapted to capture and store data received from the data transmission path, the second device being adapted to enable the data capturing means when, such as only when, data is transmitted on the data transmission path and the second device is able to receive data from the data transmission path. Thus, a division of the data handling and the controlling of data flow may be performed, where the data handling, such as data capture in the second device, may be enabled only when data is to be captured. This, again, is power saving.

In yet another embodiment, the second device further is adapted to output data to another data transmission path, the second device being adapted to output data to the other data transmission path when, such as soon as or trigged by, the data has been received from the data transmission path. In this manner, only a single buffer is required per device or node in a network of such devices. In this manner, the data, when captured, is automatically provided on an output of the device and thereby forwarded to a next device for this device to capture the data when able to do so.

Normally, systems comprise a structure not similar to the overall structure (physical layout of the conductors and paths) of data transport for transporting the clock to the devices. Oftentimes, the positions of the devices is determined by space and routing requirements of a chip, where after a clock tree structure is added independently of the data transport structure in order to provide the clocking signals to the devices.

An alternative to this would be a structure which has clock signal transmission paths substantially parallel to the data transmission path. This has advantages in relation to which delays may occur between data and clocking signals.

In a particular embodiment, the first flank is of a first flank type, the second flank is of a second flank type, the first flank type being the second flank type inverted, and wherein the first and second devices are adapted to identify, as the first and second flanks, respectively, the same flank type, the system further comprising an inverting element adapted to invert the clocking signal and transmit the inverted clocking signal to the other of the first and the second device. This is independent on the actual paths of the clocking signal in relation to the data paths.

In an alternative embodiment:
the first flank is of a first flank type,
the second flank is of a second flank type, the first flank type being the second flank type inverted,
the first and second devices are adapted to identify, as the first and second flanks, respectively, the same flank type, and one of the first and the second devices is adapted to receive the clocking signal, invert the clocking signal and transmit the inverted clocking signal to the other of the first and second device.

In this manner, the clocking signal may flow through the same devices as the data. This may be in the same direction as the data or a direction opposite thereto. In this embodiment, the actual device may invert the clocking signal before feeding this to the parts determining the first and second flanks—or may invert the signal at clocking signal output of the device. Preferably, all devices perform the inverting before determining the flanks, or all devices perform the inverting close to the timing signal output.

In these embodiments, the first and second devices may operate on the same flank type, such as a high-to-low or a low-to-high change in a square signal, while still operating on different flanks of the original clocking signal and corresponding different points in time—due to the inverting element.

In fact, when the devices may act on the same flank type (but different points in time), the devices may be identical, so that:
the first device is additionally adapted to:
receive the data from a second data transmission path and
identify the second flank of the first period of the clocking signal and then output information relating to whether the first device has received or is able to receive data from the second data transmission path,
the second device is additionally adapted to:
output data to a third data transmission path (for receipt by a third device) and
determine whether it has received receiver information (from the third device) and, if so, identify the first flank of the first period of the clocking signal and then transmit information to the third device.

An alternative to this identity would simply be to generate different first and second devices adapted to actually operate on the different flank types.

Clearly, this means that long chains of devices may be formed, where every second device acts on the first flank of the original clocking signal and every second on the second flank, where a change from the first flank type to the second flank type and vice versa may be performed between neighbouring devices.

It is also clear that the above and below behaviour may be repeated in each period of the clocking signal or a number of such periods.

In a second aspect, the invention relates to a device for use as the first device in the system of the first aspect.

In a third aspect, the invention relates to a method of transmitting data from a first device to a second device in a system wherein:
the first device is adapted to output data to a data transmission path,
the second device is adapted to receive the data from the data transmission path,
a clock generator is adapted to generate a periodic clocking signal comprising a period having a first and a second flanks,
the method comprising:
the second device identifying the first flank of a first period of the clocking signal and then outputting to the first device receiver information relating to whether the second device has received or is able to receive data from the data transmission path, the first device determining whether it has received receiver information and, if so, identifies the second flank of the first period of the clocking signal and then transmits information to the second device.

As mentioned above, it is preferred that the first and second devices output the information when trigged by the second/first flanks.

In one embodiment, the step of the first device outputting the information comprises the first device outputting the information to the data transmission path as data. In this manner, it is desired that the data is output in a parallel manner so that all data is output simultaneously and in the same clock cycle (or on the same flank).

In another embodiment, the second device comprises data capturing means adapted to capture and store data received from the data transmission path, the second device enabling the data capturing means when, such as only when, data is transmitted on the data transmission path and the second device is able to receive data from the data transmission path.

In yet another embodiment, the second device further outputs data received from the data transmission path to another data transmission path when, and preferably as soon as or trigged by, the data has been received from the data transmission path.

In a particular embodiment, the first flank is of a first flank type, the second flank is of a second flank type, the first flank type being the second flank type inverted, and wherein the identifying steps each comprise identifying, as the first and second flanks, respectively, the same flank type, the method further comprising the step of inverting the clocking signal and transmitting the inverted clocking signal to the other of the first and the second device.

In another particular embodiment, the first flank is of a first flank type, the second flank is of a second flank type, and the first flank type being the second flank type inverted, the identifying steps each comprise identifying as the first and second flanks, respectively, the same flank type, and one of the first and second devices receives the clocking signal, inverts the clocking signal and transmits the inverted clocking signal to the other of the first and second devices. In this manner, the clocking signal may be routed between the same devices that interchange data.

In these two embodiments, due to the inverter, the first and second devices may actually perform exactly the same operation, the inverting step ensuring that the devices actually operate on different flanks.

BRIEF DESCRIPTION OF THE DRAWINGS

In the following, preferred embodiments will be described with reference to the drawing, wherein.

DETAILED DESCRIPTION OF EXAMPLE EMBODIMENTS

The handshake protocol presented below enables full back pressure flow control, without the need for stall buffers, yet still allowing data transport at full clock speed.

Figure 1:
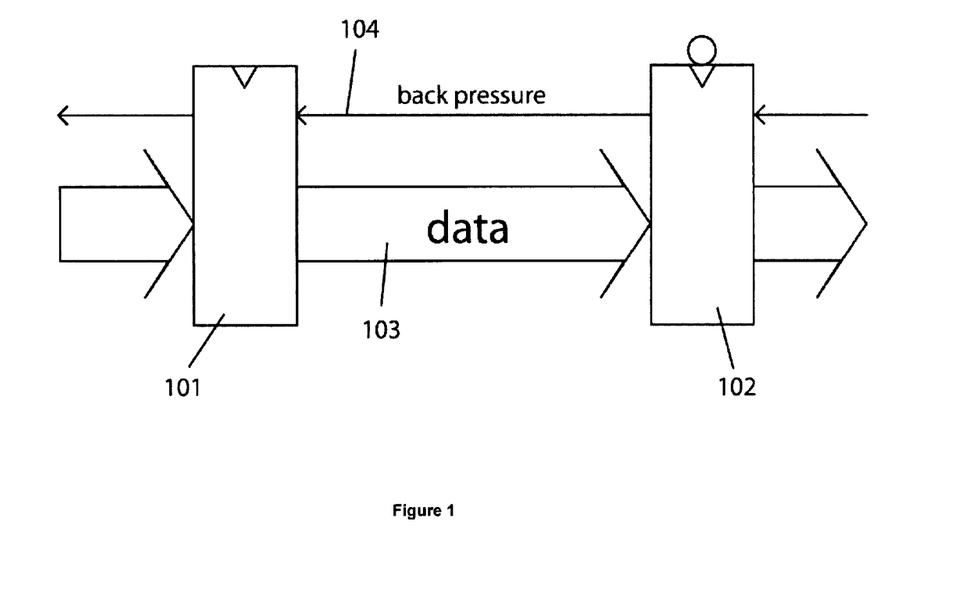
FIG. 1 illustrates pipelined stages clocked at alternating clock edges.

This is accomplished as shown in FIG. 1, by clocking pipeline stages at alternating clock edges. Hence both edges of the clock are utilized, without needing dual-edge triggered registers. The figure shows a transmitting pipeline stage (101) clocked at the positive clock edge, and a receiving pipeline stage (102) clocked at the negative clock edge. The two pipeline stages are connected by a data channel (103) and a back-pressure signal (104) in the opposite direction.

We adapt concepts from asynchronous circuit design. Local back pressure flow control is inherent in asynchronous circuits, as the movement of data is governed by local handshaking mechanisms. There exist two general types of asynchronous handshaking between a transmitter and a receiver; push and pull. In a push-type handshaking system, the transmitter provides data to the receiver and then holds the data until the receiver indicates to the transmitter that it has accepted the data. In a pull-type handshaking system, the receiver indicates to the transmitter that it is ready to accept data, and the transmitter then responds by providing this data, when it is ready to do so.

In order to realize such handshaking between a data transmitter and receiver, a minimum of two handshake phases are required; a request phase and an acknowledge phase. This is known in its general form as 2-phase handshaking. In a push-type system, the transmitter initiates the request phase (requesting the receiver to accept data) while the receiver initiates the acknowledge phase. In a pull-type system, the receiver initiates the request phase (requesting the transmitter to forward data) while the transmitter initiates the acknowledge phase. Adapting this for the synchronous domain, we utilize the two phases of the clock.

Figure 2:
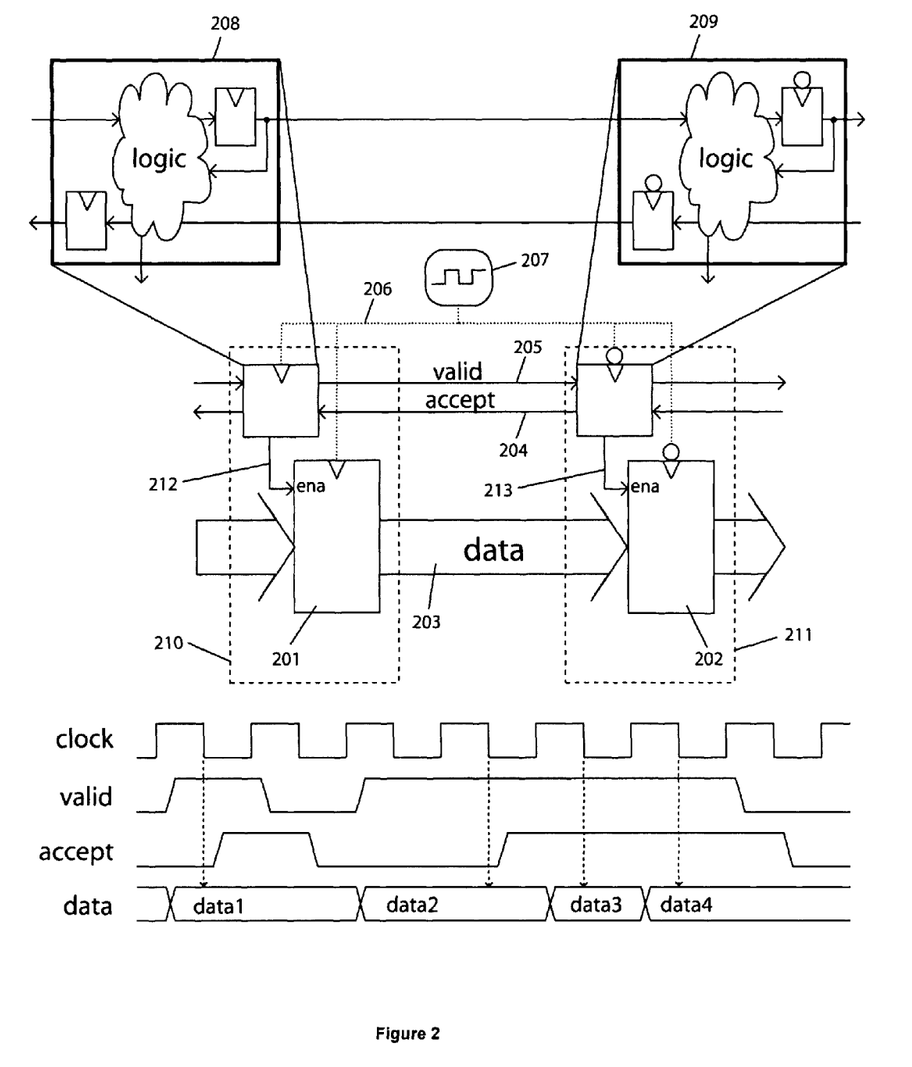
FIG. 2 illustrates the embodiment of FIG. 1 using a push type handshake.

In the following a preferred embodiment of a push-type handshake is explained, as shown in FIG. 2. The system implements two pipeline stages, a transmitter (210) and a receiver (211) connected by a data channel (203), clocked by a clock signal 206 which is generated by a clock source (207). Each pipeline stage has two parts: a controller part (208 and 209) and a data part (201 and 202). The controller part handles the handshaking and the data part stores the data, e.g. in data registers. The controller parts control the storing of data in the data parts, by means of enable signals (212 and 213). Between the controller parts of adjacent pipeline stages, a valid signal (205) is routed alongside the data indicating its validity. In the reverse direction, an accept signal (204) is used to indicate that the receiving stage has accepted the data, storing it in its data registers. Note that whereas control signals in asynchronous circuits are edge sensitive, our implementation is level sensitive, normal for synchronous circuits, using the clock edges as trigger event. Since the stages are clocked at alternating clock edges, it is possible to send the data, and receive acknowledgment from the next stage, within the same clock cycle. This allows transmitting of data at full clock speed along the pipeline, stop in an instance if congestion is detected, and resume transmission without delay once the congestion is resolved. The receiving pipeline stage (211) may either be adapted to react to the negative clock edge, or the clock signal may be inverted prior to reaching the receiver. If the latter is the case, the transmitter and receiver may be implemented as similar circuits, the receiver reacting to the negative edge of the original clock signal merely because the clock signal has been inverted before reaching the receiver stage. In the timing diagram below the figure, the dotted arrows indicate the point of time that data is registered by the receiver.

The control signals are used to derive enable signals (212 and 213) for the pipeline registers. If the forward path is congested and data is still valid, the registers will not be enabled, the data will not be overwritten. Similarly, if no data valid signal is sensed at the input, the registers will also not be enabled. Thus fine-grained clock gating is easy to implement with the flow control method. This is particularly important in network architectures, as traffic is expected to be of a bursty nature, bursty meaning that the network may lay idle for long periods, and power consumption during idleness is of a major concern.

Figure 3:
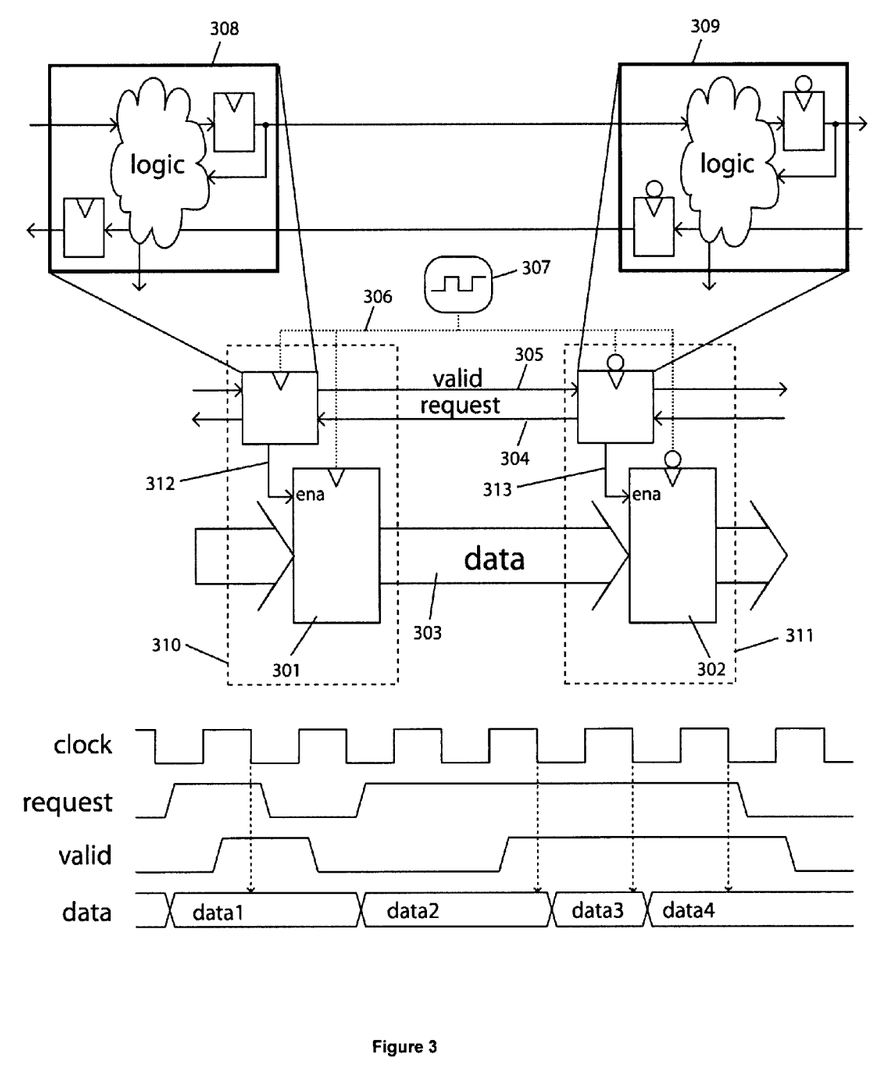
FIG. 3 illustrates an embodiment similar to that of FIG. 2 but using a pull type handshake.

FIG. 3 illustrates a similar system, but one implementing a pull-type handshake. The system implements two pipeline stages, a transmitter (310) and a receiver (311) connected by a data channel (303), clocked by a clock signal (306) which is generated by a clock source (307). Each pipeline stage has two parts: a controller part (308 and 309) and a data part (301 and 302). The controller part handles the handshaking and the data part stores the data, e.g. in data registers. The controller parts control the storing of data in the data parts, by means of enable signals (312 and 313). A request signal (304) is routed along side—but in the opposite direction of—the data (303), from receiver to transmitter. This signal indicates that the receiver is ready to receive data. In the reverse direction, a valid signal (305) is routed, indicating that the data is valid.

The handshaking scheme can be used in a simple pipeline or in more complex configurations, e.g. a system of multi-port routers. In order to illustrate the generalized handshaking concepts explained, we describe an on-chip packet-routing network. The back pressure flow control scheme employed in the network leverages important challenges of state-of-the-art system-on-chip design, by facilitating fine-grained clock gating, micro-level flow control and skew tolerant links. This is required in order to enable a scalable architecture.

Figure 4:
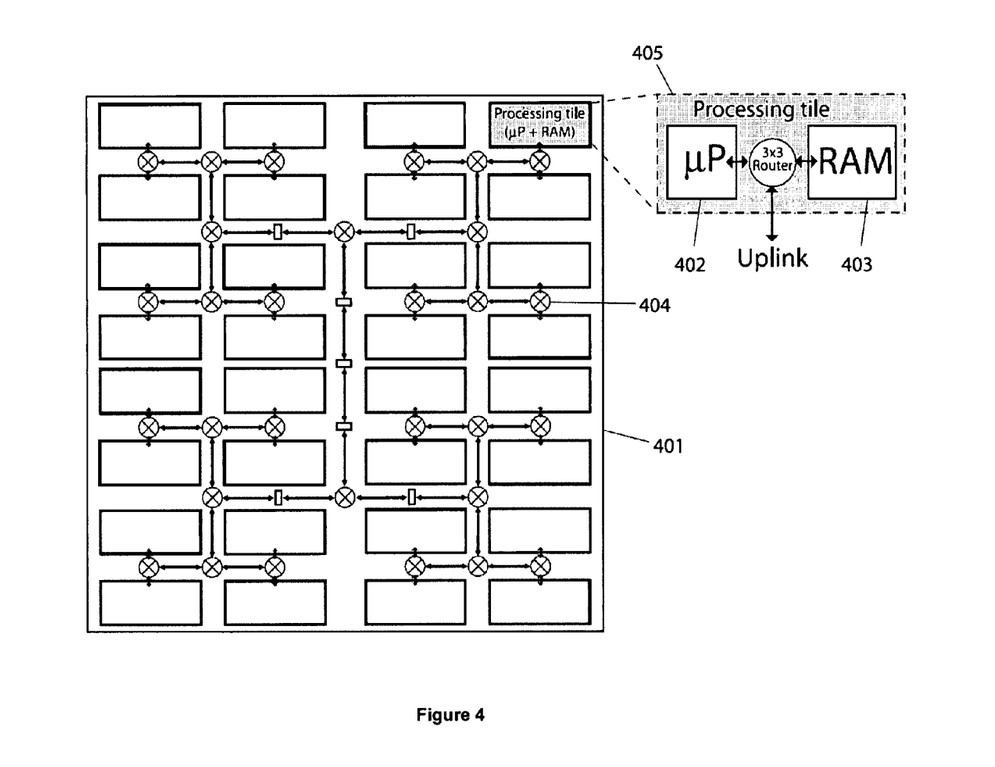
FIG. 4 illustrates an embodiment used in a homogeneous multiprocessor system.

The demonstrator system illustrated in FIG. 4 constitutes a homogeneous multiprocessor system (401). It consists of 32 processing tiles (405), each with a microprocessor (402) and a local memory (403). The microprocessors and memories are connected in a tree of routers (404).

Figure 5:
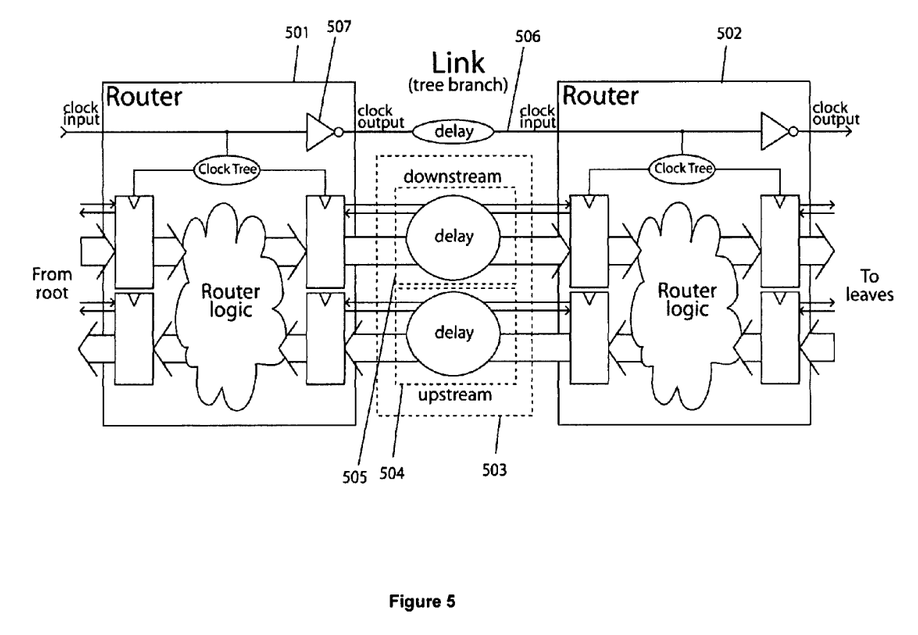
FIG. 5 illustrates an embodiment having a bidirectional link.

FIG. 5 shows the basics of two routers (501 and 502) and a bidirectional link (503) between them. Links are implemented as two independent, unidirectional handshake channels: upstream (504) and downstream (505). The skew tolerance of the handshaking scheme is utilized to implement a special clock distribution method, where the clock (506) is distributed along side the data. The figure thus illustrates how the clock is inverted by an inverting circuit (507) and forwarded on the link, implementing the flow control and timing scheme described herein.

What is claimed is:

1. A system, comprising:
   a first data transmission path,
   a first device for outputting data to the first data transmission path,
   a second device for receiving the data from the first data transmission path,
   a clock generator for generating a periodic clocking signal including a period having a first flank and a second flank, wherein
   the second device is configured to identify the first flank of a first period of the periodic clocking signal and then output to the first device receiver information relating to whether the second device has received or is able to receive data from the first data transmission path, and
   the first device is configured to determine whether the first device has received the receiver information and, if so, identify the second flank of the first period of the periodic clocking signal and then transmit data to the second device.

2. A system according to claim 1, wherein the first device is configured to output data to the first data transmission path.

3. A system according to claim 1, wherein the second device comprises a data capturing device configured to capture and store data received from the first data transmission path, the second device being configured to enable the data capturing device when data is transmitted on the first data transmission path and the second device is able to receive data from the first data transmission path.

4. A system according to claim 1, wherein the second device further is configured to output data to a second data transmission path, the second device being configured to output data to the second data transmission path when the data has been received from the first data transmission path.

5. A system according to claim 1, wherein the first flank is of a first flank type and the second flank is of a second flank type, the first flank type being the second flank type inverted, and the first and second devices are configured to identify, as the first and second flanks, respectively, either the first flank type or the second flank type, the system further including an inverting element configured to invert the periodic clocking signal to generate an inverted clocking signal and transmit the inverted clocking signal to one of the first and the second devices.

6. A system according to claim 1, wherein:
   the first flank is of a first flank type,
   the second flank is of a second flank type, the first flank type being the second flank type inverted,
   the first and second devices are configured to identify, as the first and second flanks, respectively, either the first flank type or the second flank type, and
   one of the first and the second devices is configured to receive the periodic clocking signal, invert the periodic clocking signal to generate an inverted clocking signal and transmit the inverted clocking signal to the other of the first and second devices.

7. A system according to claim 1, further comprising a clock signal transmission path, wherein the first data transmission path and the clock signal transmission path are at least parallel.

8. A device for use as the first device in the system according to claim 1.

9. A system according to claim 1, wherein the second device is configured to identify the first flank of a first period of the periodic clocking signal in each of a number of consecutive periods of the periodic clocking signal.

10. A system according to claim 9, wherein the first device is configured to determine whether the first device has received the receiver information in each of the number of consecutive periods.

11. A method of transmitting data from a first device to a second device in a system wherein:
   the first device is configured to output data to a first data transmission path,
   the second device is configured to receive the data from the first data transmission path, and
   a clock generator is configured to generate a periodic clocking signal including a period having a first flank and a second flank,
   the method comprising:
      identifying, by the second device, the first flank of a first period of the periodic clocking signal and then outputting to the first device receiver information relating to whether the second device has received or is able to receive data from the first data transmission path, and
      determining, by the first device, whether the first device has received the receiver information and, if so, identifying the second flank of the first period of the periodic clocking signal and then transmitting data to the second device.

12. A method according to claim 11, wherein the first device outputting the information includes the first device outputting data to the first data transmission path.

13. A method according to claim 11, wherein the second device comprises data capturing means adapted to capture and store data received from the first data transmission path, the second device enabling the data capturing means when data is transmitted on the first data transmission path and the second device is able to receive data from the first data transmission path.

14. A method according to claim 11, wherein the second device further outputs data received from the first data transmission path to a second data transmission path when the data has been received from the first data transmission path.

15. A method according to claim 11, wherein the first flank is of a first flank type, the second flank is of a second flank type, the first flank type being the second flank type inverted, and wherein the identifying of the first flank of the first period of the periodic clocking signal each includes identifying, as the first and second flanks, respectively, either the first flank or the second flank type, the method further comprises inverting the periodic clocking signal to generate an inverted clocking signal and transmitting the inverted clocking signal to one of the first and the second devices.

16. A method according to claim 11, wherein the first flank is of a first flank type, the second flank is of a second flank type, and the first flank type being the second flank type inverted, the identifying of the first flank of the first period of the periodic clocking signal each includes identifying as the first and second flanks, respectively, either the first flank or the second flank type, and where one of the first and second devices receives the periodic clocking signal, inverts the periodic clocking signal to generate an inverted clocking signal and transmits the inverted clocking signal to the other of the first and second devices.

17. A method according to claim 11, wherein the second device is configured to identify the first flank of a first period of the periodic clocking signal in each of a number of consecutive periods of the periodic clocking signal.

18. A method according to claim 17, wherein the first device is configured to determine whether the first device has received the receiver information in each of the number of consecutive periods.

* * * * *